(12) United States Patent
Travostino et al.

(10) Patent No.: US 6,564,325 B1
(45) Date of Patent: May 13, 2003

(54) METHOD OF AND APPARATUS FOR PROVIDING MULTI-LEVEL SECURITY ACCESS TO SYSTEM

(75) Inventors: Franco Travostino, Arlington, MA (US); Tal Lavian, Sunnyvale, CA (US); Thomas Hardjono, Arlington, MA (US); Rob Duncan, San Francisco, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/307,523

(22) Filed: May 7, 1999

(51) Int. Cl.[7] ............................ H04L 9/32; H04L 9/10
(52) U.S. Cl. .................. 713/200; 713/185; 713/172; 713/159; 713/169
(58) Field of Search ...................... 713/200, 185, 713/172, 159, 169

(56) References Cited

U.S. PATENT DOCUMENTS 6,216,230 B1 * 4/2001 Rallis et al. ................ 713/185
6,401,205 B1 * 6/2002 Rallis et al. ................ 713/172
6,425,084 B1 * 7/2002 Rallis et al. ................ 713/185

OTHER PUBLICATIONS

Java™ Security Architecture (JDK1.2), Li Gong, Oct. 2, 1998, Version 1, 1997–1998, Sun Microsystems, Inc.

G. McGraw and E. Felton, "Java Security", Wiley (1987), Chapter 2, "The Java Security Model" pp. 27–48.

* cited by examiner

Primary Examiner—Ly V. Hua
(74) Attorney, Agent, or Firm—Gibbons, Del Deo, Dolan, Griffinger & Vecchione

(57) ABSTRACT

A software system provides security against unauthorized operations initiated by software code supplied by an untrusted source. The allowed operations that are associated with the software code are determined. A thinned interface is generated which permits the software code to successfully call only the allowed operations. The software code is independent of a security environment of the system. The thinned interface operates in at least one version of the security environment. The software code and the thinned interface are activated within the system.

30 Claims, 2 Drawing Sheets

METHOD OF AND APPARATUS FOR PROVIDING MULTI-LEVEL SECURITY ACCESS TO SYSTEM

BACKGROUND OF THE INVENTION

The invention is directed to systems that incorporate instructions supplied by external, non-trusted sources and, more particularly, to dynamic, transparent multi-level security for such systems.

Many systems, such as telephone network products and data communication products, include externally developed software applications that require calls to various functions within the system. It is desirable, however, to limit the functions that can be called by the application to those that are necessary or that are approved for the developer of the application. Therefore, the systems typically include a security model that requires the application to include code which requests authorization and receives permission or denial to carry out the respective function call. As an example, the Java environment includes security devices such as a security manager, a byte code verifier and a class loader. However, the security devices of a respective environment may be non-backward compatible with earlier versions. In the Java environment, for example, the security devices in version 1.2 are not backward compatible with those in versions 1.1 and 1.0.2, and the security devices in version 1.1 are not backwards compatible with those in version 1.0.2. Thus, an application program written in a respective version of Java is not compatible with other versions.

Furthermore, in some programming environments, such as in the Java environment, the security devices provide multi-level security but are not transparent, namely the user code must explicitly interact with the system, and the security devices are not dynamic, namely that off-line changes to the system may be necessary. Alternatively, the security devices are code transparent but do not provide multi-level security.

It is therefore desirable to restrict access to a system by untrusted external code using a dynamic, transparent, multi-level security device that is not code dependent or dependent upon the version of the environment used.

SUMMARY OF THE INVENTION

The present invention provides a security defense that is transparent to the software application. The code of the application is written at a level above the security devices and is version independent.

The invention includes a security access mediator that receives and authenticates the externally supplied software code, determines the functions that are permitted to the respective application, and then dynamically generates an interface that allows the software application to call only a portion of the full set of function calls. The subset of function calls in the interface is determined as a function of one or more of the following: the credentials of the user that supplies the software application and the user' corresponding service access levels; the service access levels assigned to the software application; the device that will run the software application; the time and circumstances under which the application is to be run; the credentials of the server that supplies the software application and its corresponding service access levels; the functions that are to be called by the application; and when the downloading of the application is requested by another application, the credentials of the requesting application and its corresponding service access levels. Further, the security access mediator is operable in one or more versions of the programming environment.

In accordance with the invention, a method and an apparatus provide security against unauthorized operations in a system that includes software code supplied by an untrusted source. The allowed operations that are associated with the software code are determined. A thinned interface which permits the software code to successfully call only the allowed operations is generated. The software code is independent of a security environment of the system. The thinned interface operates in at least one version of a security environment. The software code and the thinned interface are activated within the system.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
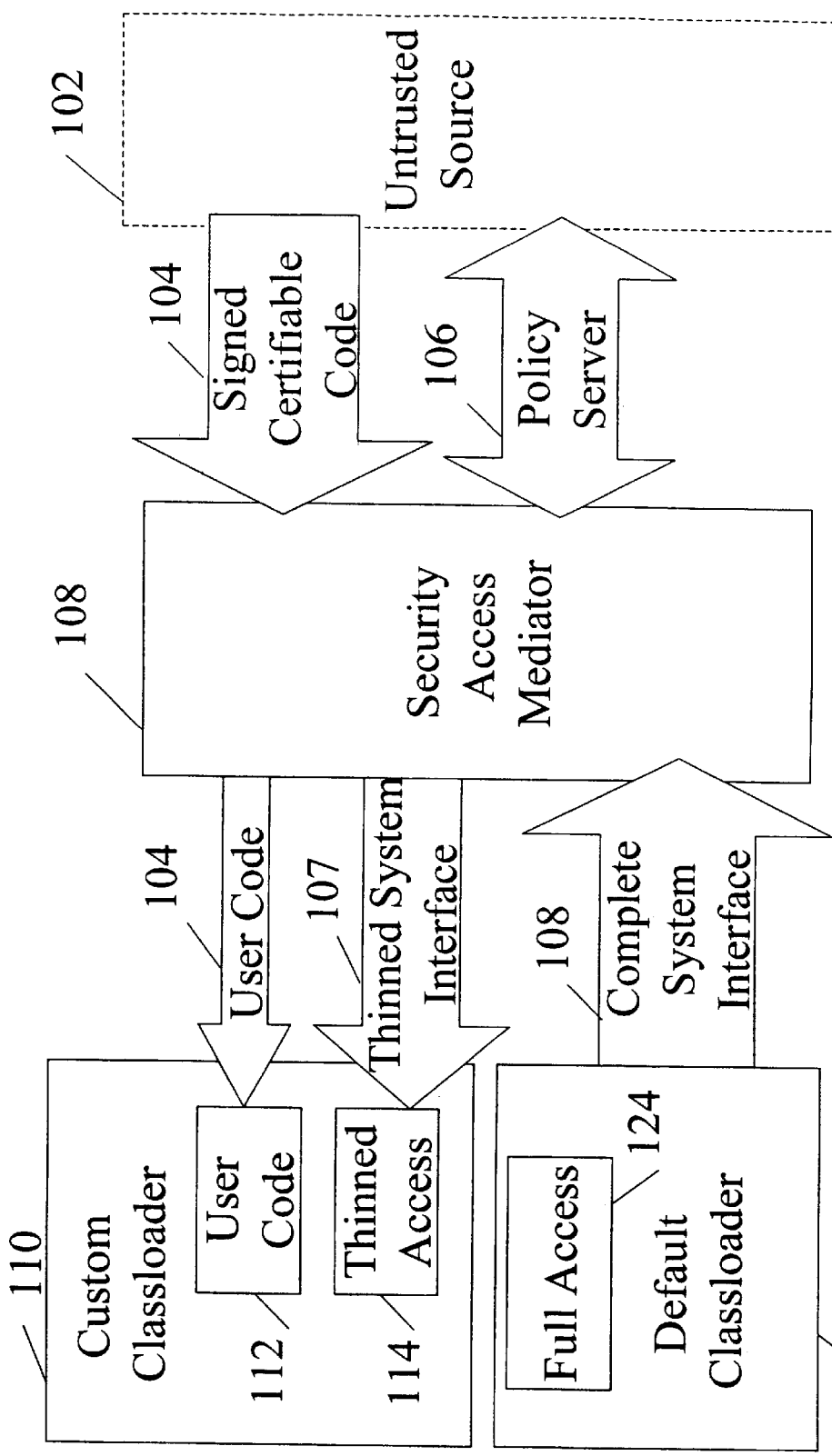
FIG. 1 is a block diagram showing an example of a security system according to the invention.

Referring first to FIG. 1, there is shown a security portion of a system in accordance with the invention. Signed, certifiable code 104 is supplied from an untrusted network 102, namely from a supplier or developer that potentially may attempt to carry out unauthorized system calls, to a security access mediator 100. Typically, the code includes an identifier, which may be an encryption key, that indicates the supplier of the code and may also indicate whether the code was tampered with.

Also provided is a policy server 106 which includes a file or other data structure that indicates the associated privileges. As an example, the associated privileges may include permission to perform "open", "read" and "close" operations but does not include permission to carry out "write" operations.

The associated privileges are determined from one or more of the following:

1) The associated privileges may depend on the credentials of the user that supplies the code 104 and the user's corresponding service access levels.
2) The associated privileges may be depend on the service access levels assigned to the applications that comprise the code 104. As an example, the applications may have privileges that restrict it to a predefined set of operations regardless of the privileges assigned to whomever invokes the code.
3) The associated privileges may be depend on the device that will run the code 104. Thus, two respective devices running the same code may have different privileges.
4) The associated privileges may be depend on when the code 104 is to be run. Thus, the same code may have different privileges on the same device at different time or under different circumstances.

5) The associated privileges may be depend on the credentials of the server that supplies the code 104 and its corresponding service access levels.

6) The associated privileges may be depend on the functions that are to be carried out by an application within the code 104. As an example, the functions that are to be called may be determined prior to downloading, such as from an application programming interface (API). When the application is determined to include only "read" or "get-value" operations, the code may be downloaded without generating a thinned interface, whereas when the application includes "write" or "set-value" operations, a thinned interface is generated.

7) Further, when the downloading of the application is requested by another application, the associated privileges may be depend on the credentials of the requesting application and its corresponding service access levels.

The signed, certifiable code 104 and the policy server106 are described in further detail in U.S. application Ser. No. 09/307,452 filed Apr. 30, 1999, which is incorporated herein by reference.

A default classloader 120 includes a full access region 124 that comprises the full list of function calls that would ordinarily be permitted to by code supplied from a trusted source. A complete system interface 108 comprising the full list of function calls is supplied by the default classloader 120 to the security access mediator.

A security access mediator 100 provides multi-level security for the signed, certifiable code 104 by generating a "thinned" system interface 107, namely a set of thinned permissions set out by the thinned interface, for the code 104 as a function of the associated privileges stored in the policy server106. The mediation then supplies the code 104 and the "thinned" system interface to a custom classloader 110 which activates the user code 104 and the thinned access 114.

The thinned interface is an interface that permits only a subset of all possible function invocations. As an example, a full interface may include four operations, such as "open", "close", "read" and "write". The thinned interface may allow only the "open", "close", and "read" operations to provide read-only access to an application. Alternatively, the thinned interface may allow only the "open", "close", and "write" operations, but not the "read" operation, to permit the application to log events to an audit file without permitting the application to read data supplied by other application programs.

Significantly, the code 104 that forms the application program is developed from a list of function calls and commands that are written in a respective software environment, such as the Java environment, but which do not include environment-specific security devices for requesting permission and receiving permission or denial to carry out the respective functions. Rather, the security access mediator 100 generates environmentspecific code, such as in the Java environment, that comprises the thinned interface. The thinned interface is generated as a function of the permissions stored in the policy server106. Thus, the externally supplied code 104 is not prone to problems caused by non-backward compatible changes to successive versions of the security devices of the Java environment or other environments. Additionally, the user identity stored in the externally supplied code 104 and the files stored in the policy server106 are likewise version independent.

Additionally, when the code 104 attempts to call a function that is prohibited, the thinned interface causes the prohibited function call to fail and generates an exception, such as a message indicating that an "unknown" operation has been attempted.

Moreover, the thinned interface is formed dynamically, namely on-the-fly, based on the user identity and the permissions stored in the policy server at the time the thinned interface is formed so that the files in the policy server do not need to account for all possible combinations of permissions.

Figure 2:
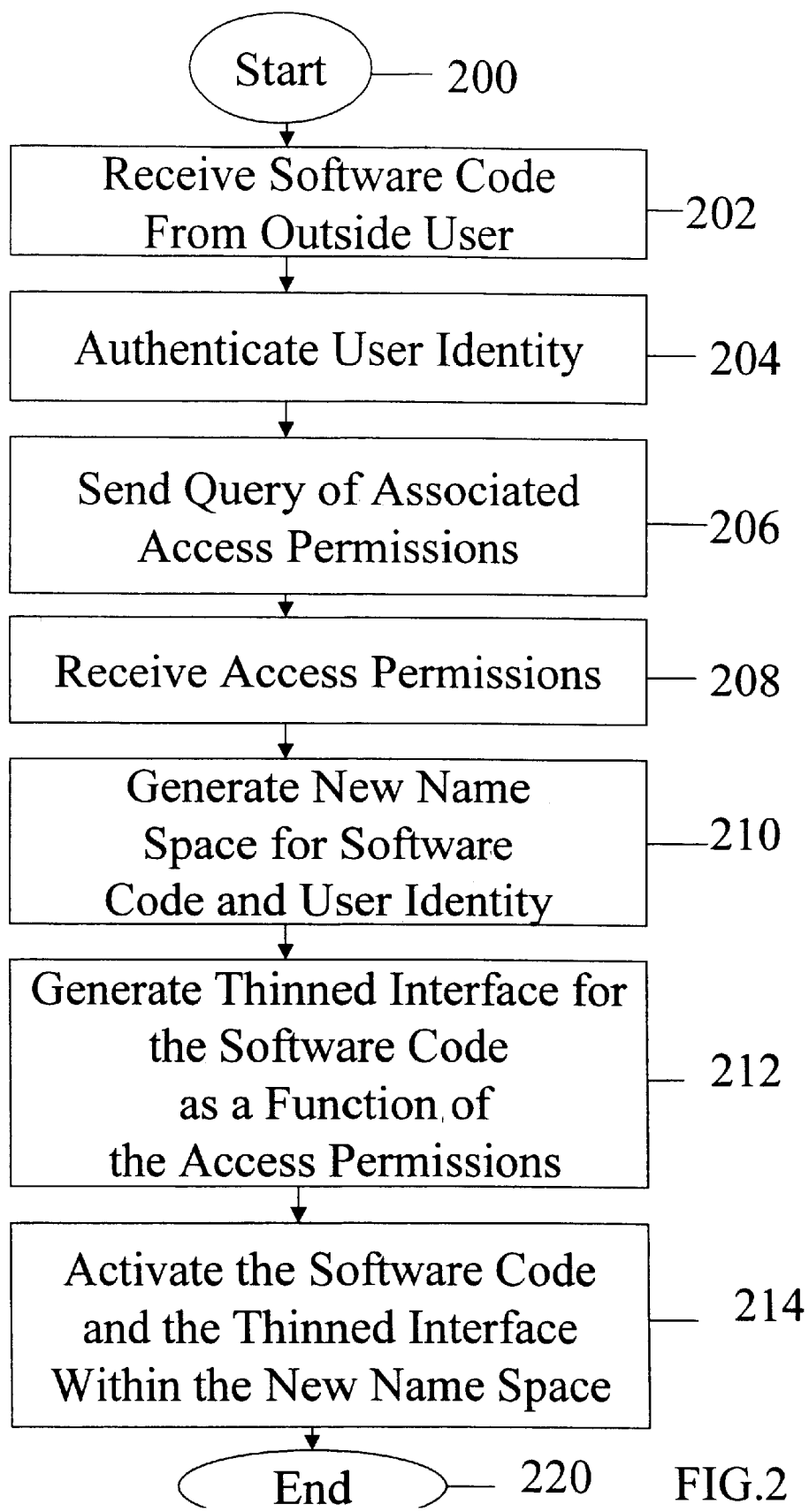
FIG. 2 is a flow chart illustrating a sequence of operations carried out by the invention to provide security.

FIG. 2 is a flow chart showing the operation of the security access mediator 100. At step 202, software code supplied by an untrusted, outside user is uploaded from the network to the security access mediator 100, and at step 204, the identity of the outside user is authenticated. Then, at step 206, the security access mediator queries the policy server106 to determine the associted access permissions. The security access mediator then receives the associated access permissions from the policy server at step 208.

Thereafter, a new name space for the software code and the user identity is generated at step 210. Then, at step 212, the security access mediator generates a thinned interface for the software code as a function of the access permissions as described above, and at step 214, the software code and the thinned interface are delivered to and activated within the new name space.

The security access mediator thus enables the transfer of externally provided software application code from an untrusted supplier to a proprietary device or system without risking access to unauthorized function calls within the system. Furthermore, the externally supplied code is backwards compatible because it does not include any security devices. Instead, the security access mediator generates environment-dependent code, such as in the Java environment, that accommodates plural versions of the software environment.

Although the present invention has been described in relation to particular embodiments thereof, many other variations and modifications and other uses may become apparent to those skilled in the art. It is preferred, therefore, that the present invention be limited not by the specific disclosure herein, but only by the appended claims.

What is claimed is:

1. A method of providing security against unauthorized operations in a system that includes software code supplied by untrusted sources, the software code including at least one function call for calling an operation, said method comprising the steps of:

determining allowed operations associated with the software code;

generating a thinned interface which permits the software code to successfully call only the allowed operations, the software being independent of a security environment of the system, the thinned interface operating in at least one version of the security environment; and activating the software code and the thinned interface within the system.

2. The method of claim 1 further comprising the step of receiving the software code from an external source.

3. The method of claim 1 further comprising the step of authenticating the user identity.

4. The method of claim 1 further comprising the step of supplying a query, to a policy region, of the allowed operations associated with the user identity.

5. The method of claim 1 wherein the thinned interface is dynamically generated.

6. The method of claim 1 further comprising the step of generating new name space for the software code and the user identity.

7. The method of claim 1 wherein said security environment is a Java environment.

8. The method of claim 1 wherein the allowed operations are a portion of a greater set of operations.

9. The method of claim 1 wherein, when the software code attempts to call an operation that is not one of said allowed operations, said thinned interface generates an exception.

10. The method of claim 1 wherein said allowed operations are determined as a function at least one of the following: credentials of a user that supplies the software code and corresponding service access levels of the user; service access levels assigned to applications within the software code; service access levels assigned to devices that run the applications; the time that the application is run; circumstances under which the application is be run; credentials of a server that supplies the applications and its corresponding service access levels; the function call carried out by the application; and when downloading of the code is requested by another application, credentials of the requesting application and its corresponding service access levels.

11. An apparatus for providing security against unauthorized operations in a system that includes software code supplied by untrusted sources, the software code including at least one function call for calling an operation, said apparatus comprising:

means for determining allowed operations associated with the software code;

means for generating a thinned interface which permits the software code to successfully call only the allowed operations, the software being independent of a security environment of the system, the thinned interface operating in at least one version of the security environment; and means for activating the software code and the thinned interface within the system.

12. The apparatus of claim 11 further comprising means for receiving the software code from an external source.

13. The apparatus of claim 11 further comprising means for authenticating the user identity.

14. The apparatus of claim 11 further comprising means for supplying a query, to a policy region, of the allowed operations associated with the user identity.

15. The apparatus of claim 11 wherein the thinned interface is dynamically generated.

16. The apparatus of claim 11 further comprising means for generating new name space for the software code and the user identity.

17. The apparatus of claim 11 wherein said security environment is a Java environment.

18. The apparatus of claim 11 wherein the allowed operations are a portion of a greater set of operations.

19. The apparatus of claim 11 wherein, when the software code attempts to call an operation that is not one of said allowed operations, said thinned interface generates an exception.

20. The apparatus of claim 11 wherein said allowed operations are determined as a function at least one of the following: credentials of a user that supplies the software code and corresponding service access levels of the user; service access levels assigned to applications within the software code; service access levels assigned to devices that run the applications; the time that the application is run; circumstances under which the application is be run; credentials of a server that supplies the applications and its corresponding service access levels; the function call carried out by the application; and when downloading of the code is requested by another application, credentials of the requesting application and its corresponding service access levels.

21. An apparatus for providing security against unauthorized operations in a system that includes software code supplied by untrusted sources, the software code including at least one function call for calling an operation, said apparatus comprising:

a policy server for determining allowed operations associated with the software code;

a security access mediator for generating a thinned interface which permits the software code to successfully call only the allowed operations, the software being independent of a security environment of the system, the thinned interface operating in at least one version of the security environment; and a classloader for activating the software code and the thinned interface within the system.

22. The apparatus of claim 21 further comprising a receiver receiving the software code from an external source.

23. The apparatus of claim 21 further comprising an authenticator authenticating the user identity.

24. The apparatus of claim 21 wherein said security access mediator supplies a query, to said policy region, of the allowed operations associated with the user identity.

25. The apparatus of claim 21 wherein the thinned interface is dynamically generated.

26. The apparatus of claim 21 wherein said security access mediator generates new name space for the software code and the user identity.

27. The apparatus of claim 21 wherein said security environment is a Java environment.

28. The apparatus of claim 21 wherein the allowed operations are a portion of a greater set of operations.

29. The apparatus of claim 21 wherein, when said software code attempts to call an operation that is not one of said allowed operations, said thinned interface generates an exception.

30. The apparatus of claim 21 wherein said allowed operations are determined as a function at least one of the following: credentials of a user that supplies the software code and corresponding service access levels of the user; service access levels assigned to applications within the software code; service access levels assigned to devices that run the applications; the time that the application is run; circumstances under which the application is be run; credentials of a server that supplies the applications and its corresponding service access levels; the function call carried out by the application; and when downloading of the code is requested by another application, credentials of the requesting application and its corresponding service access levels.

* * * * *